United States Patent [19]

Walker, Jr.

[11] 4,222,546
[45] Sep. 16, 1980

[54] PORTABLE EQUIPMENT STAND

[76] Inventor: Sanders B. Walker, Jr., R.F.D. #1, McRae, Ga. 31055

[21] Appl. No.: 971,837

[22] Filed: Dec. 19, 1978

[51] Int. Cl.² ............................................. F16F 15/00
[52] U.S. Cl. .................................. 248/676; 248/158; 248/639
[58] Field of Search .............. 248/158, 357, 415, 507, 248/508, 676, 639

[56]  References Cited
       U.S. PATENT DOCUMENTS

| 1,272,613 | 7/1918 | Broemel | 248/676 X |
| 4,010,914 | 3/1977 | Kowalski | 248/158 X |
| 4,047,685 | 9/1977 | Wika | 248/158 |

Primary Examiner—James C. Mitchell
Attorney, Agent, or Firm—Cushman, Darby & Cushman

[57] ABSTRACT

A portable workstand primarily designed to support a plurality of different types of reloading presses and related equipment to allow a variety of operations to be performed on metallic cartridge and shotshell cases without the necessity of changing presses. The workstand includes a base which is universally mountable to the hub portion of tires to varying sizes and a top plate that is provided with a plurality of particularly shaped slots and a variety of mounting hole patterns which together cooperate to allow substantially all conventional reloading press equipment to be mounted thereon with up to about four reloading tools or combinations of presses and tools being simultaneously mountable.

12 Claims, 3 Drawing Figures

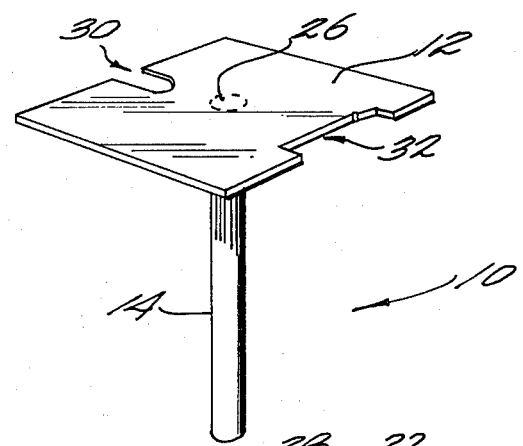
Fig. 1
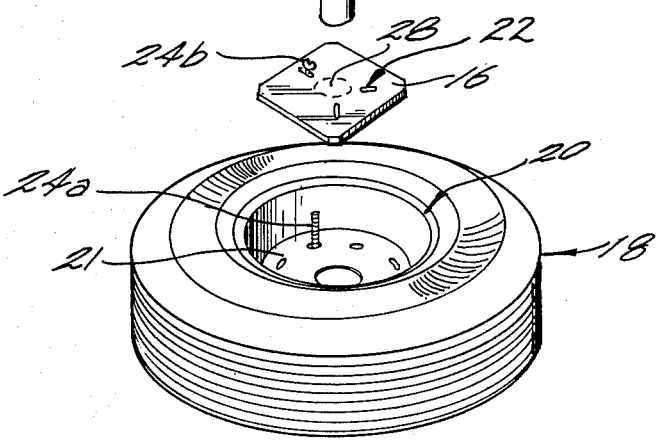
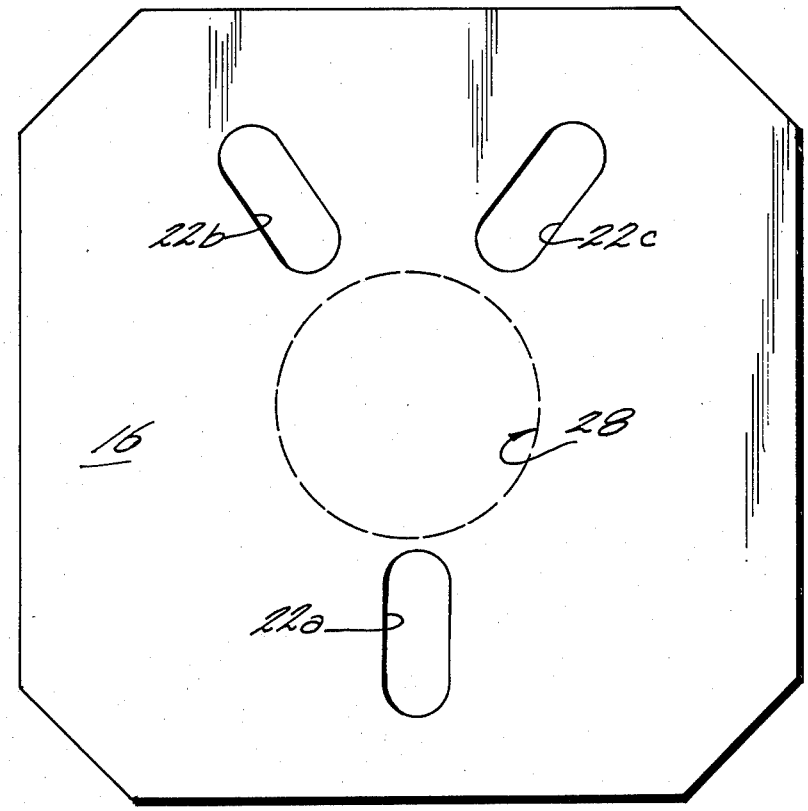
Fig. 3

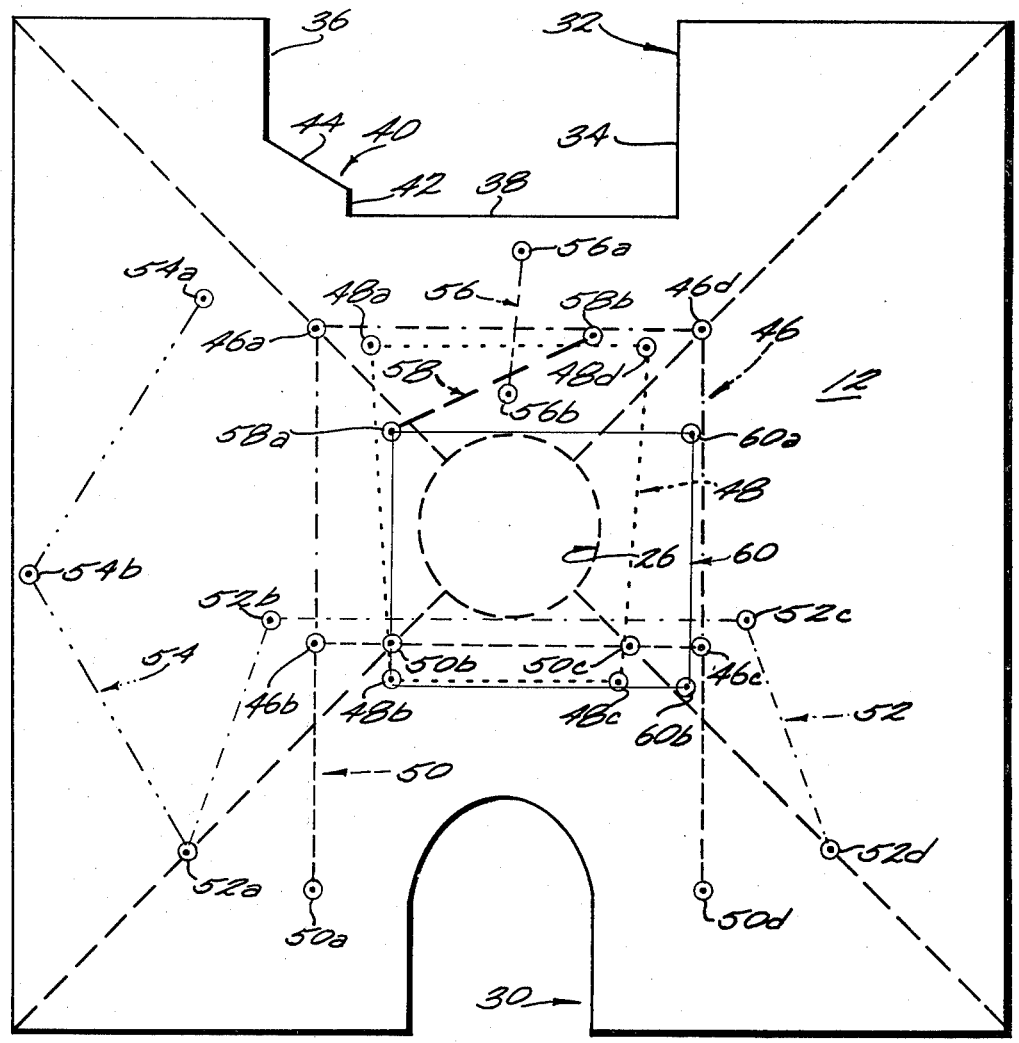

PORTABLE EQUIPMENT STAND

BACKGROUND OF THE INVENTION

Workstands have been known in the past which have held reloading equipment. While many of these have been devices designed primarily for fixed use in a shop area, an example of a design for reloading press mounting stands that is collapsible and capable of portable use is shown in U.S. Pat. No. 4,047,685. The problem with the stand in this patent, as well as other known devices, is that the mounting plate used thereon is capable of supporting only a single piece of equipment at a time.

It is well known that in reloading cartridge cases especially when dealing with different guns and, accordingly, different calibers and lengths, sizes and types, many different sizes of dies and a number of different devices as well as operations are required. These involve beveling and deburring the case, lubricating the case, reforming or resizing the neck of metallic cartridge cases, removing the primer and placing a new primer in the case as well as flaring the neck of the cartridge case in order to receive the bullet, charging the cartridge case with a predetermined amount of powder and then placing, seating and crimping the bullet in the case. A number of similar process stages are also involved in reloading shotgun ammunition. Thus, when a tool stand can hold only one tool, a number of tool changes must be effected in order to accomplish each of these various operations. Since particular pieces of reloading equipment must be supported in an individual fashion, it is necessary to sequentially perform each of the various operations, one at a time, on the entire batch of cartridges then being reloaded. Reloading techniques are described in the RCBS Reloading Guide, Third Edition, the RCBS brochure entitled "The 7 'Mysteries' of Reloading Unveiled with Photos", and in the Winchester handbook entitled "Ball Powder Loading Data", Third Edition.

I am aware of only one other type of portable device that is mounted in a tire, as this present invention can be, and this prior device is shown in U.S. Pat. No. 4,010,914. This patent relates to a primer cord dispenser and employs a particular type of hub and parallel bearing assembly mounted therein which allows the dispenser to freely rotate as primer cord is removed. In addition, the use of the tire insulates the dispenser from the ground and assists in preventing inadvertent electrical sparking.

SUMMARY OF THE PRESENT INVENTION

The preferred exemplary embodiment of the present invention is comprised primarily of two plates, specifically a bottom plate which is substantially universally mountable to a wide variety and size of standard automobile tires and in particular to their wheel rims, and an upper mounting plate, shaped to include a variety of slots and mounting hole patterns. A supporting bar or shaft is secured between the two plates and is centrally positioned to each. Because of the particular design of the top plate a number of reloading presses, including different types or models, can be simultaneously supported so that multiple operations can be performed sequentially on shell or cartridge cases that are being reloaded without having to make tool changes or changing dies within tools.

With the foregoing objects in mind, and other such objects and advantages as may become apparent to those skilled in the art as this specification proceeds, this preferred embodiment of my invention is shown and more particularly described hereinafter with reference to the accompanying drawings in which:

DESCRIPTION OF THE DRAWINGS

FIG. 1 is a perspective view of the device;
FIG. 2 is a top plan view of the top mounting plate;
FIG. 3 is a top plan view of the base support plate.

DESCRIPTION OF THE PREFERRED EMBODIMENT

Turning first to FIG. 1, the exemplary embodiment of my present invention is set forth generally at 10 and is comprised of a top mounting plate 12, a centrally located support shaft 14 and a base support plate 16. The device is portable and can be mounted as for example to a tire generally indicated at 18 and specifically to the wheel rim generally indicated at 20. There are a wide variety of rims used on cars and the number of mounting holes 21 vary from 3 to at least 6. The base plate 16 is provided with three radially extending slots, generally indicated in FIG. 1 at 22, which are shown more specifically in FIG. 3 at 22a, 22b and 22c. In the preferred embodiment these slots are about $\frac{3}{8}$ inches in width. In order to mount the device to the tire 18 all that is necessary is to position base plate 16 adjacent the hub 20 and overlying holes 21 and rotating plate 16 until the radial slots 22 align with three of the holes 21 and thereafter securing the device to the tire by means of bolts 24a and nuts 24b.

The support shaft 14 is preferably made from black iron pipe having an outer diameter of about $2\frac{3}{8}$ inches and is secured to the center of top plate 12 by any convenient means such as by being welded along a welding line indicated at 26 centrally provided in plate 12. Shaft 14 is secured in a similar fashion centrally of base plate 16 as by being welded within an opening indicated at 28 located centrally in base plate 16.

Radial slots 22b and 22c are positioned circumferentially about opening 28 and equally spaced, radially therefrom so as to be about 60° to about 80° from one another and each respectively about 140° to about 150° from slot 22a. It should also be noted that the top portions of slots 22b and 22c are tilted slightly away from the radius extending from the center of plate 16, past the lower portion of those slots toward the two upper corners so the slots can be more readily aligned with the bolt hole patterns in a wide variety of wheel rims preferably with most five and six lug configurations. As shown in this preferred embodiment, base plate 16 is formed from $\frac{3}{8}$ inch steel sheet and is dimensioned approximately 8 inch by 8 inch.

As shown in FIGS. 1 and 2, top plate 12 is provided with two cutouts or slots, generally indicated at 30 and 32, which are located directly opposite from each other on opposite sides of top plate 12.

Slot 30, which is aligned with opening 26 is about $2\frac{1}{2}$ inches in width and extends inwardly from the side of plate 12 about $3\frac{1}{2}$ inches terminating along a curved inner face having a radius of about $1\frac{1}{4}$ inches. Slot 32, which is also positioned substantially in line with slot 30 and opening 26, is substantially rectangular in shape and is generally defined by sidewalls 34 and 36 and a front wall 38. The left inner corner in FIG. 2 is provided with an extension or an additional portion generally indicated at 40, defined by a wall portion 42 which extends outwardly from inner wall 38 and a slanting wall portion 44 which connects wall portion 42 with sidewall 36. The angled wall portion 44 is approximately 45° with respect to sidewall 36 and provides additional support and aligning surfaces for use with particular loading presses. The width of opening 32 is about 6 inches and wall 34 is approximately 2¾ inches long whereas sidewall 36 is approximately 1¾ inches long with wall 42 being about ½ inch in length. As shown in this preferred embodiment, top plate 12 is formed from ⅜ inch steel sheet and is dimensioned approximately 14 inches by 14 inches.

A plurality of mounting holes are provided on plate 12 in the form of a variety of patterns or groups, as shown in FIG. 3. These can be broken down into approximately 8 groups as follows. The first is in the form of a square generally indicated at 46, extending around the central part of plate 12 (i.e. about welding line 26) and includes holes 46a—d. The second is in the form of a rectangle, generally indicated at 48, which lies substantially within the boundaries of square 46 and includes holes 48a–48d.

A U-shaped pattern, generally indicated at 50, is comprised of holes 50a, 46b, 50b, 50c, 46c and 50d, and this pattern extends about but is spaced inwardly from the inner periphery of slot 30.

A trapezoidal-shaped pattern, generally indicated at 52, is comprised of holes 52a–52d and lies inwardly of the U-shaped pattern 50, while a V-shaped pattern, generally indicated at 54, comprised of holes 54a, 54b and 52a is located substantially on the left side of plate 12, as shown in FIG. 2. Two other straight-line patterns are generally indicated at 56 and 58 and respectively include holes 56a and 56b and 58a and 58b.

Finally, another substantially rectangular pattern, generally indicated at 60, is also positioned so as to extend about the central part of plate 12. This pattern includes half inch holes 60a and 60b which are horizontally spaced about 4½ inches respectively from holes 58a and 48a.

The following chart shows the approximate distances between each hole:

| HOLES | APPROXIMATE DISTANCE THEREBETWEEN |
| --- | --- |
| 46a–46b | 4 ⅞ inches |
| 46b–46c | 5 ½ inches |
| 46c–46d | 4 ⅞ inches |
| 46d–46a | 5 ½ inches |
| 48a–48b | 4 ¾ inches |
| 48b–48c | 3 ½ inches |
| 48c–48d | 4 ¾ inches |
| 48d–48a | 3 ¾ inches |
| 50a–46b | 3 ⅞ inches |
| 46b–50b | 1 ½ inches |
| 50b–50c | 3 inches |
| 50c–46c | 1 ½ inches |
| 46c–50d | 3 ⅞ inches |
| 52a–52b | 3 ½ inches |
| 52b–52c | 6 ⅞ inches |
| 52c–52d | 3 ½ inches |
| 54a–54b | 4 ½ inches |
| 54b–52a | 4 ½ inches |
| 56a–56b | 2 inches |
| 58a–58b | 3 inches |
| 58a–48b | 3 ½ inches |
| 48b–60b | 4 ½ inches |
| 60b–60a | 3 ½ inches |
| 60a–58a | 4 ½ inches |

By providing these particular hole patterns on top plate 12 it is possible to mount a wide variety of equipment on reloading presses which include their own clamps and which can slide within either slot 30 or 32 and be clamped onto plate 12. Accordingly, it is possible to employ processing stations, provided by each individual press, mounted together on top plate 12 so that a number of operations can be performed on each shell without the necessity of changing dies or changing presses to accommodate different phases of a reloading operation. For example, a Lyman All American cartridge press could be mounted to the center of plate 12 within rectangle 60. A Lyman 450 Bullet sizer and lubricator could then be mounted within slot 32 and a compact system is formed allowing the sizing, lubricating and setting of bullets.

While the preferred embodiment shows my present invention as being mounted to the rim of a spare tire so that it is extremely portable and easily set up for "in field use", it should be understood that this support stand can also be bolted to other bases so long as it is rigidly supported. In this regard, it will be noted from FIG. 1, that when welding top plate 12 and bottom plate 16 to the support shaft 14 it is essential that radial slot 22a, which is the only slot on one side of mounting plate 16, be aligned with the lie directly beneath slot 30 of top mounting plate 12. When the device is assembled in this fashion radial slots 22b and 22c will, therefore, lie directly beneath slot 32. By aligning the slots 30 and 32 in this fashion with the radial slots in mounting base 16, excess leverage can be effectively accommodated or absorbed. Excess leverage situations can arise because smaller presses, usually mounted within slot 30, usually require additional leverage to compensate for their smaller size. By having the two bolt holes 22b and 22c located on the opposite side of base plate 16, the additional leverage used with smaller presses can be more evenly divided thereby assuring the device is properly secured to the supporting structure regardless of whether it is tire 18, a plywood base, for example, a 30 inch square of three quarter plywood, or other material.

Of the types of reloading equipment that have been used on this device, the following are exemplary: the Lee "Load-All", the MEC Case Conditioner, Ponsness-Warren Shotgun Shell Reloading Presses, Lyman presses and bullet sizers or lubricators and RCBS presses including the RCBS, Jr. and Rock Chucker model presses. Included within this group are presses for dealing with both metallic cartridge and shotshell case equipment and include many different models of presses as well as a wide variety of tools. This toolstand has also been found useful in supporting other types of shop equipment including drill presses, vises, walk boards and saws.

While the invention has been described in connection with what is presently conceived to be the most practical and preferred embodiment, it is to be understood that the invention is not to be limited to the disclosed embodiment but on the contrary, is intended to cover various modifications and equivalent arrangements included within the spirit and scope of the appended claims, which scope is to be accorded the broadest interpretation of such claims so as to encompass all such equivalent structures.

What I claim is:

1. A portable reloading press stand comprising a top and base member respectively connected to the opposite ends of a support pipe, said base member having first means defining a single hole on one side of said support pipe and second means defining a pair of spaced apart holes on the opposite side of said support pipe said first and second means cooperating together for providing mounting holes for properly supporting said press, said top member having means defining first and second slots positioned on opposite sides of said top member and extending inwardly from the exterior thereof, said first slot having a curved interior, said second slot having a substantially rectangular shape, said top and base members being secured to said support pipe so that said first slot is positioned directly above said single hole.

2. A portable press stand as in claim 1 wherein said second slot is defined by an interior edge and two side edges and includes at least one shaped interior corner comprising a portion extending outwardly from said interior edge and inwardly from one of said side edges, said portion having an angled interiorly facing edge.

3. A portable press stand as in claim 2 wherein said angled edge has an angle of about 45°.

4. A portable press stand as in claim 1 wherein said top member further includes means defining a plurality of groups of holes for mounting tools thereon.

5. A portable press stand as in claim 4 wherein one group is comprised of ½ inch holes and another group is comprised of 9/32 inch holes.

6. A portable reloading press stand as in claim 4 wherein at least two different groups of said holes are arranged in separate substantially rectangular patterns about the center of said top member.

7. A portable reloading press stand as in claim 4 wherein at least one group of said holes is arranged in a V-shaped pattern extending along one side of said top member so that the pattern lies substantially between the interior boundary of said first and second slots.

8. A portable reloading press stand as in claim 4 wherein at least one group of said holes is arranged in a trapezoidal pattern about the interior end of said first slot.

9. A portable reloading press stand as in claim 1 wherein said first slot is about 2.5 inches wide and about 3.5 inches long and said second slot is about 6 inches wide and about 3 inches deep.

10. A portable reloading press stand as in claim 1 wherein said base member is mounted to the hub portion of an automobile wheel.

11. A portable reloading press stand as in claim 1 wherein each hole in the pair of holes comprising said second hole means is circumferentially spaced from the single hole a distance ranging between about 140° to about 150°.

12. A portable reloading press stand as in claim 11 wherein the pair of holes comprise elongated slots having front and rear portions positioned so that the rear portion of the slots is angled circumferentially inwardly of the radial on which the front portion of the slot is positioned.

* * * * *